United States Patent

Barrett, Jr.

[15] 3,704,761

[45] Dec. 5, 1972

[54] BATTERY SUPPORT ARRANGEMENT

[72] Inventor: Arthur M. Barrett, Jr., Lake Forest, Ill.

[73] Assignee: Barrett Electronics Corporation, Northbrook, Ill.

[22] Filed: June 3, 1970

[21] Appl. No.: 42,933

[52] U.S. Cl. ............... 180/68.5, 248/316 B, 248/361
[51] Int. Cl. ............................................. B62d 25/00
[58] Field of Search ....... 180/68.5, 65; 248/361, 316, 248/316 A, 316 B; 24/248; 279/23

[56] References Cited

UNITED STATES PATENTS

| 3,147,018 | 9/1964 | Reichert | 279/23 X |
| 3,392,668 | 7/1968 | Young et al. | 279/23 X |
| 3,058,714 | 10/1962 | Oliver | 248/316 X |
| 2,031,508 | 2/1936 | Scott | 180/68.5 |
| 2,914,148 | 11/1959 | Bock | 248/361 X |
| 3,197,166 | 7/1965 | Sandler | 248/361 X |

FOREIGN PATENTS OR APPLICATIONS

| 669,035 | 10/1936 | Germany | 248/361 |

Primary Examiner—Benjamin Hersh
Assistant Examiner—John P. Silverstrim
Attorney—Johnson, Dienner, Emrich, Verbeck & Wagner

[57] ABSTRACT

An arrangement for supporting and releasably retaining a battery and the like in centered position on a carrier including a base plate adapted to support a pair of opposed gate members each having first and second plate portions forming an acute angle therebetween, the gate members being pivotal between first positions adapted to receive a battery therebetween and second positions to center the battery and lockingly retain it between the gate members.

10 Claims, 7 Drawing Figures

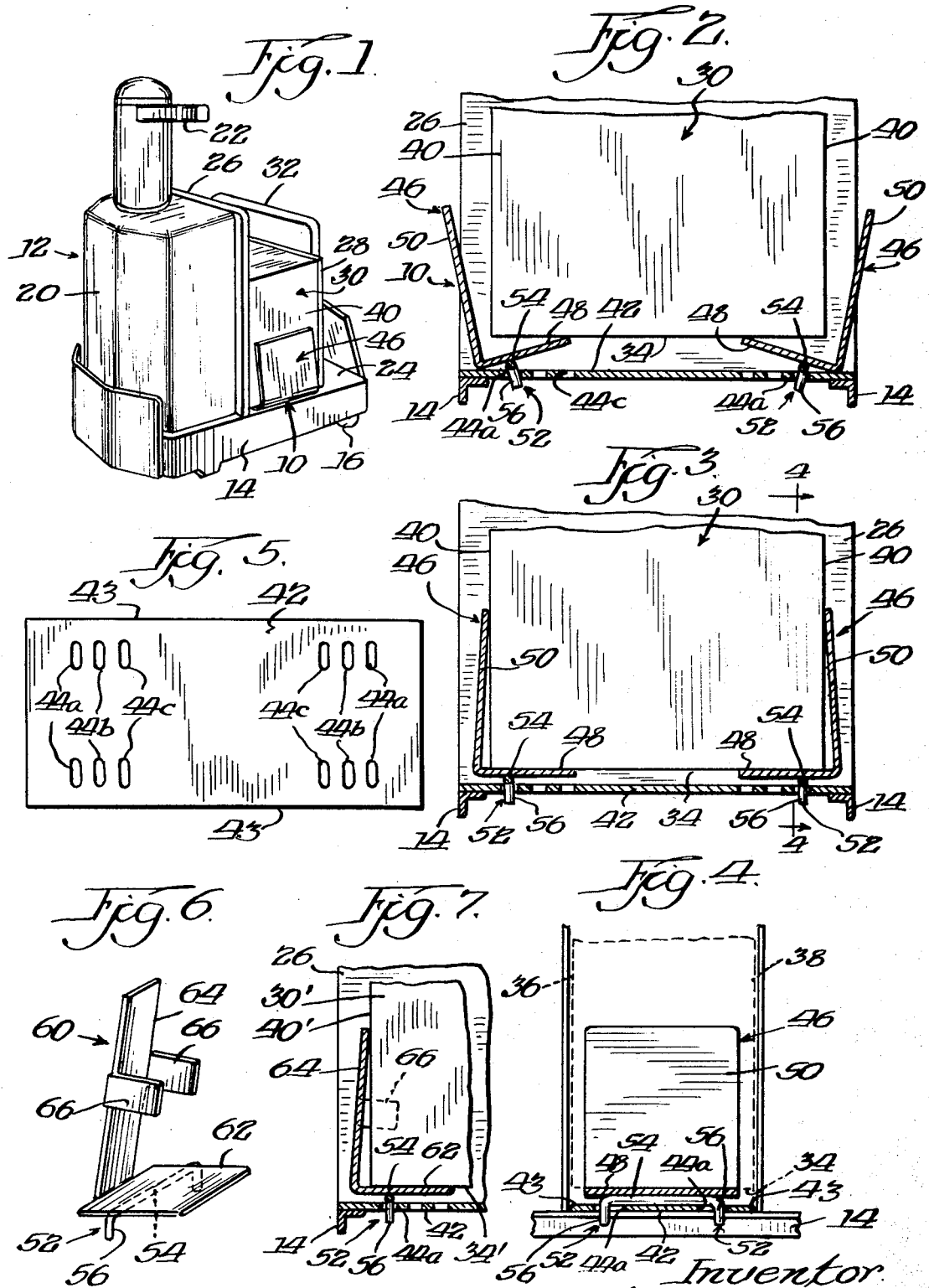

BATTERY SUPPORT ARRANGEMENT

BACKGROUND OF THE INVENTION

The present invention relates generally to arrangements for supporting batteries and the like, and more particularly to a battery support arrangement providing self-centering and self-locking of a battery supported thereby.

In battery operated devices such as electric tractors and pallet trucks as used in material handling operations and the like, the batteries generally require frequent mounting and removal from the associated devices for recharging. This is particularly so where the trucks are used in heavy work schedules and it is not economically practical to maintain the trucks in a "-down" condition as when recharging their batteries while disposed on the trucks. The batteries used with electric tractors and trucks are generally of substantial size, ranging in weight up to hundreds of pounds and having external dimensions which create relatively high centers of gravity. As a result, it is important that the battery support arrangements for the electric trucks be adapted to allow easy mounting and removal of the batteries, while maintaining them in stable centered positions during operation of the trucks. The known battery supporting arrangements utilize locking straps, clamps and bolts which are time consuming in adjustment and present projections which can cause injury to operators as well as damage to adjacent stacked materials and the like. There thus exists a need for an economical, efficient, and yet relatively simple battery support arrangement. The present invention provides an improved battery support arrangement which satisfies this need.

SUMMARY OF THE INVENTION

One of the primary objects of the present invention is to provide a novel battery support arrangement which allows ready mounting and removal of a battery while providing self-centering and self-locking of the battery supported thereby.

Another object of the present invention is to provide a battery support arrangement which eliminates projecting locking bolts and straps through providing novel battery gates adapted to receive a battery therebetween and effect self-locking of the battery while allowing ready removal of the battery from the support arrangement.

Another object of the present invention is to provide a battery support arrangement as described wherein the battery gates are pivotally supported in laterally spaced relation on a base plate, the battery gates being normally disposed to receive a battery therebetween and being moved to battery locking positions responsive to engagement with a battery.

Another object of the present invention is to provide a battery support arrangement as described wherein the locking or clamping force applied by the battery gates against a battery are dependent upon the weight of the battery supported.

Another object of the present invention is to provide a battery support arrangement for use with relatively thin batteries and which employs battery gates having spaced arms adapted to engage forward and rear surface portions of a battery to provide both lateral and longitudinal retention of the battery.

Further objects and advantages of the preset invention, together with the organization and manner of operation thereof, may best be understood by reference to the following description of a preferred embodiment of the invention when taken in conjunction with the accompanying drawing in which like reference numerals designate like parts throughout the several views.

BRIEF DESCRIPTION OF THE DRAWING

FIG. 1 is a perspective view of an electric powered tractor having a battery support arrangement in accordance with a preferred embodiment of the present invention;

FIG. 2 is an enlarged partial transverse sectional view through the center of the battery well of FIG. 1 with the battery shown as being received between the battery gate members;

FIG. 3 is a partial transverse sectional view similar to FIG. 2, but showing the battery fully retained between the battery gate members;

FIG. 4 is a partial sectional view taken along the line 4—4 of FIG. 3, looking in the direction of the arrows, with the battery shown in phantom;

FIG. 5 is a top plan view of the base support plate for the battery gate members;

FIG. 6 is a perspective view of an alternate battery gate member for use with a relatively thin battery; and FIG. 7 is a partial transverse sectional view somewhat similar to FIG. 3 but showing a battery in cooperation with a battery gate member constructed in accordance with FIG. 6.

DESCRIPTION OF PREFERRED EMBODIMENTS

Referring now to FIG. 1 of the drawing, a battery support arrangement in accordance with the present invention is indicated generally at 10, and is illustrated, by way of example, in combination with an electric tractor indicated generally at 12. The electric tractor 12 includes a chassis 14 supported on rear laterally spaced wheels 16 and a forward centrally disposed drive wheel (not shown) in a known manner. The chassis 14 supports an electric drive motor and associated drive means within an enclosure housing 20, the drive motor being adapted to effect driving movement of the forward central drive wheel in a conventional manner. A generally horizontally disposed steering arm 22 is supported above the housing 20 and is associated with the forward drive wheel in a manner to effect steering of the tractor 12. The steering lever 22 has speed and brake control means combined therewith to allow an operator standing on a rear platform portion 24 to control movement of the tractor 12 as is known.

An upstanding plate 26 is secured to the rear portion of the housing 20 in transverse relation to the longitudinal axis of the tractor 12 and cooperates with a second upstanding transversely disposed plate 28 to define a battery well therebetween which receives an electric storage battery 30. A transverse hand bar 32 is secured to the truck chassis 14 adjacent the rear upstanding plate 28 and serves as a holding bar for the operator as well as preventing the operator from engaging the battery 30 during operation of the tractor 12. The battery 30 is of a conventional rectangular configuration having a bottom surface 34 (FIG. 2), forward and rearward parallel planar end surfaces 36 and 38 (FIG. 4) disposed in normal relation to the plane of the bottom surface 34, and upstanding parallel planar side surfaces 40 lying in planes normal to the planes of the forward and rearward surfaces 36 and 38 and the bottom surface 34. The upstanding plate 28 is spaced longitudinally rearwardly from the upstanding plate 26 a distance sufficient to receive the battery 30 therebetween with the plates 26 and 28 preventing longitudinal movement of the battery. The battery support arrangement 10 in accordance with the present invention is adapted to receive and support the battery 30 within the battery well defined by the upstanding plates 26 and 28, and maintain the battery in a self-locking self-centering position relative to the longitudinal axis of tractor 12 during operation thereof.

Noting FIGS. 2-5, the battery support arrangement 10 includes base means comprising a horizontal base plate 42 suitably secured to the chassis 14 of the tractor 12 in transverse relation to the longitudinal axis of the tractor. The base plate 42 has a width, considered longitudinally of the tractor, generally equal to the longitudinal distance between the spaced upstanding plates 26 and 28, and may have its parallel edge portions 43 secured to the lower associated portions of the spaced upstanding plates as by welding or other suitable means to define a rigid battery receiving well with the upstanding plates. The base plate 42 has a plurality of pairs of elongated openings or apertures 44a–c therethrough, the pairs of openings being spaced longitudinally along the base plate with each opening having an opposite paired opening spaced equidistantly from and on the opposite side of the major longitudinal axis of the plate. In this manner, the pairs of openings 44a–44 are symetrical about the minor axis of the base plates, with the major axes of the openings comprising each pair of openings lining in a common line parallel to the longitudinal axis of tractor 12.

The battery support arrangement 10 includes a pair of battery gate members, each of which is indicated generally at 46, supported by the base plate 42 equidistantly on opposite sides of the longitudinal axis of the tractor 12. The battery gate members 46 are identical in configuration and each includes a first plate portion 48 adapted to engage the bottom surface 34 of a battery 30, and a second plate portion 50 disposed in upstanding relation to the first plate portion 48 and adapted to engage a corresponding side surface 40 of the battery. The first and second plate portions 48 and 50 of each battery gate member 46 are preferably formed integral, as from a common steel plate, and form an acute angle therebetween. It has been found that forming the upstanding second plate portion 50 at an included angle of approximately about 88° 30' relative to the plane of the first plate portion 48 provides the desired self-locking and self-centering action of the battery gate members in cooperation with a battery 30, as will become more apparent hereinbelow. Each of the first and second plate portions 48 and 50, respectively, of each of the battery gate members 46 has a width, considered in its operative position longitudinally of the tractor 12, slightly less than the distance between the longitudinally spaced upstanding plates 26 and 28.

Each of the battery gate members 46 is pivotally supported on the base plate 42 through an inverted U-shaped retainer member, indicated generally at 52. Each of the retainer members 52 is preferably formed from cylindrical bar stock and has a horizontal portion 54 secured to the lower or under surface of a first plate portion 48, and downwardly depending leg portions 56, the axes of which are normal to the plane of the first plate portion 48. The downwardly depending leg portions 56 of the retainer members 52 are formed parallel and are adapted to be selectively received within one of the pairs of elongated openings 44a–c in the base plate 42, the horizontal portions 54 of the retainer members being supported on the upper surface of the base plate between the associated pair of openings 44a, b or c. To this end, the elongated openings of each pair of openings 44a–c are spaced from the major axis of the base plate 42 sufficiently to receive the depending legs 56 of a retainer member 52, while the minor axes of the elongated openings are slightly greater than the diameters of the depending legs 56 to allow pivotal or rocking movement of the battery gate members on the base plate 42. The retainer members 52 are secured to the lower surfaces of the plate portions 48 of the battery gate members 46 such that the centers of gravity of the gate members are disposed outwardly from their respective pivot axes 52 relative to the longitudinal axis of the tractor 12. In this manner, the second plate portions 50 of the battery gate members 46 will be urged outwardly by gravity to positions as shown in FIG. 2 when a battery 30 is not mounted within the battery support arrangement 10.

The operation of the battery support arrangement 10 is as follows. With a pair of battery gate members 46 supported by the base plate 42 in cooperation with selected pairs of openings such as 44a, and in first outward or open positions as shown in FIG. 2, a battery 30 is lowered into a position between the open battery gate members. As the battery is lowered, its lower surface 34 will engage the first plate portions 48 of the battery gate members 46 and cause the battery gates to pivot about their respective pivot axes 54. As the battery 30 is lowered to a position to fully engage the first plate portions 48, the battery gate members 46 will be pivoted to second positions wherein the plate portions 50 engage the corresponding side surfaces 40 of the battery in clamping locking relation therewith. Such clamping or locking action is responsive to engagement of the battery with the first plate portions 48 of the battery gate members, thus creating a self-locking action. In this fashion the clamping and locking forces acting on the battery as applied by the second plate portions 50 of the battery gate members are of a magnitude dependent upon the weight of the battery, and include downward force components acting on the battery to retain the battery in locked position within the battery support arrangement 10. In a similar manner, the horizontal force components acting on the battery are of equal and opposite force whereby to effect self-centering of the battery between the battery gates 46.

When it is desired to remove a battery 30 from the battery support arrangement 10 for recharging the battery, it is merely necessary to lift the battery in an upward direction relative to the battery support arrangement. Upward movement of the battery 30 in this fashion releases the downward force on the first plate portions 48 of the battery gate members 46 with a resultant release of the clamping or locking forces applied by the second upstanding plate portions 50 of the battery gate members to allow complete removal of the battery from the battery support arrangement 10.

As noted above, the base plate 42 has a plurality of pairs of elongated openings 44a–c therein to accommodate batteries of varying width, considered transverse to the longitudinal axis of the electric tractor 12.

FIGS. 6 and 7 illustrate an alternative embodiment of a battery gate member which is indicated generally at 60. The battery gate member 60 is generally similar to the above described battery gate members 46 and finds particular application in supporting relatively thin batteries, for example, batteries of a thickness, considered longitudinally of the tractor, substantially less than the distance between the upstanding plates 26 and 28 on the tractor 12. To this end, the battery gate member 60 includes a first plate portion 62 and an upstanding second plate portion 64 forming an acute included angle of approximately about 88° 30' with the first plate portion in a similar manner to the above described plate portions 48 and 50 of the battery gate member 46. The first plate portion 62 of the battery gate member 60 has a planar configuration or size generally equal to plate portion 48 of the described gate member 46, and has a retainer member 52 secured to the lower surface thereof in similar fashion to the battery gate member 46.

The second plate portion 64 of the battery gate member 60 has a width, considered transverse to its longitudinal length, approximately equal to the width of the thin battery to be supported thereby, and has a pair of inwardly directed, parallel, spaced arms 66 which are preferably formed integral with the plate portion 64. The arms 66 are spaced apart a distance sufficient to engage corresponding side surfaces of the thin battery, indicated at 30' in FIG. 7, received therebetween such that the arms retain the battery longitudinally on the truck 12. In mounting a thin battery 30' within a battery arrangement utilizing laterally spaced battery gate members 60, one of which is shown in FIG. 7, the bottom surface 34' of the battery 30' is caused to engage the first plate portions 62 of the battery gate members 60 and effect pivotal movement of the gate members to positions wherein the plate portions 64 act against the corresponding end surfaces 40' of the battery 30'. The plate portions 64 establish the same self-locking and self-centering as obtained with the battery gate members 46. In addition, the arms 66 provide longitudinal support for the battery on the tractor. Similarly, the pivotal retainers 52 of the battery gate members 60 may be varied within the elongated openings 44a–c in the base plate 42 in similar fashion to the above described positioning of the battery gate members 46 to accommodate varying width batteries.

While preferred embodiments of the present invention have been shown and described, it will be obvious to those skilled in the art that changes and modifications may be made therein without departing from the invention in its broader aspects.

I claim:

1. In a battery support arrangement for supporting a battery in an electrically powered tractor having a pair of spaced members to form a first and second side of a battery receiving well, which battery has a bottom surface and parallel side surfaces disposed generally normal to the plane of the bottom surface, the improvement comprising generally horizontal base plate means supported between the spaced members which define the battery receiving well, a pair of spaced gate members, supporting means supporting said gate members for pivotal movement on said base plate means, said gate members each having a first bottom plate portion adapted to engage the bottom surface of said battery, and a second plate portion disposed in generally upstanding relation to said first plate portion and adapted to engage a corresponding side surface of the battery, said supporting means comprising pivot means defining a pivotal axis between the first bottom plate portion of each of said gate members and said horizontal base plate means, each of said gate members being normally biased for movement about said pivotal axis to first positions wherein said second plate portions open outwardly toward their upper ends preparatory to receiving a battery therebetween such that the bottom surface of the battery engages said first plate portions, said gate members being pivoted about said pivotal axis to second positions responsive to engagement of the battery with said first plate portions only as it approaches the bottom of said well to effect clamping engagement of said second plate portions against the associated side surfaces of the battery.

2. A battery support arrangement as defined in claim 1 wherein said first and second plate portions of each of said gate members form an acute included angle therebetween.

3. A battery support arrangement as defined in claim 4 wherein each of said gate members is adapted to exert a downward force component on the battery when said gate members are in their second battery engaging positions.

4. A battery support arrangement as defined in claim 2 wherein each of said included angles has a magnitude of approximately about 88° 30'.

5. A battery support arrangement as defined in claim 1 wherein said second plate portions of said gate members have spaced parallel arms thereon adapted to receive a battery therebetween, said arms being spaced approximately equal to the distance between corresponding sides of the battery received therebetween so as to engage the corresponding battery side portions in supporting relation therewith.

6. A battery support arrangement as defined in claim 5 wherein said first and second plate portions of each of said gate members form an acute included angle therebetween.

7. A battery support arrangement for supporting a battery having a bottom surface and parallel side surfaces disposed generally normal to the plane of the bottom surface, comprising, in combination, generally horizontal base plate means having pairs of openings therethrough, a pair of spaced gate members, means supporting said gate members for pivotal movement on said base plate means, said gate members each having a first plate portion adapted to engage the bottom surface of a battery, and a second plate portion disposed in generally upstanding relation to said first plate portion and adapted to engage a corresponding side surface of the battery, said supporting means comprising retainer members secured to said first plate portions of said gate members and having downwardly depending leg portions adapted to be received through selected pairs of said openings, and being positioned so that said gate members are normally biased to first positions wherein said second plate portions open outwardly toward their upper ends preparatory to receiving a battery therebetween such that the bottom surface of the battery engages said first plate portions, said gate members being moved to second positions responsive to engagement of the battery with said first plate portions to effect clamping engagement of said second plate portions against the associated side surfaces of the battery.

8. A battery support arrangement as defined in claim 7 wherein said retainer members are secured to said gate members to define pivot axes disposed such that said gate members are biased to their said first positions by gravity preparatory to receiving a battery therebetween.

9. In combination with an electrically powered tractor and the like having longitudinally spaced upstanding plates disposed in transverse relation to the longitudinal axis of the truck, the plates defining a battery receiving well therebetween, and the battery having a bottom surface and upstanding end surfaces generally normal to the bottom surface, battery supporting and locking means including a generally horizontal support base supported between the spaced plates defining the battery well, a pair of laterally spaced gate members, means supporting said gate members for pivotal movement on said support base, said gate members having first plate portions directed toward each other in transverse relation to the longitudinal axis of the truck and second upstanding plate portions, said supporting means comprising retainer members secured to said first plate portions of said gate members and defining a pivotal axis between the first plate portions of each of said gate members and said support base, said pivot axis of each of said gate members being located such that said gate members are normally biased to first positions by gravity prior to receipt of a battery therebetween, whereby said second plate portions open outwardly toward their upper ends preparatory to receiving a battery between said second plate portions for engagement with said first plate portions, said gate members being moved to second positions to effect clamping engagement of said second plate portions with the side surfaces of the battery responsive to engagement of the battery with said first plate portions.

10. The combination of claim 9 wherein said first and second plate portions of each of said gate members form an acute included angle therebetween, and wherein said gate members exert a clamping force on a battery when said gate members are in their said second positions of a magnitude dependent upon the weight of the battery.

* * * * *

UNITED STATES PATENT OFFICE
CERTIFICATE OF CORRECTION

Patent No. 3,704,761    Dated December 5, 1972

Inventor(s) Arthur M. Barrett, Jr.

It is certified that error appears in the above-identified patent and that said Letters Patent are hereby corrected as shown below:

Column 6, line 34, change "4" to "2".

Signed and sealed this 15th day of May 1973.

(SEAL)
Attest:

EDWARD M. FLETCHER, JR.
Attesting Officer

ROBERT GOTTSCHALK
Commissioner of Patents